United States Patent
Surianarayanan (10) Patent No.: US 11,782,602 B2
(45) Date of Patent: Oct. 10, 2023

(54) PROVIDING PRIORITY INDICATORS FOR NVME DATA COMMUNICATION STREAMS

(71) Applicant: Western Digital Technologies, Inc., San Jose, CA (US)

(72) Inventor: Ravishankar Surianarayanan, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 149 days.

(21) Appl. No.: 17/357,153

(22) Filed: Jun. 24, 2021

(65) Prior Publication Data
US 2022/0413698 A1 Dec. 29, 2022

(51) Int. Cl.
G06F 3/06 (2006.01)
H04L 67/141 (2022.01)

(52) U.S. Cl.
CPC ............ *G06F 3/061* (2013.01); *G06F 3/0631* (2013.01); *G06F 3/0655* (2013.01); *G06F 3/0679* (2013.01); *H04L 67/141* (2013.01)

(58) Field of Classification Search
CPC ........ H04L 47/805; H04L 67/61; H04L 65/80
See application file for complete search history.

(56) References Cited

U.S. PATENT DOCUMENTS

| | | | |
|---|---|---|---|
| 7,043,593 B1 * | 5/2006 | Tischler | G06F 13/161 710/311 |
| 7,222,200 B2 | 5/2007 | Gupta et al. | |
| 9,430,419 B2 | 8/2016 | Jones et al. | |
| 2011/0231616 A1 | 9/2011 | Lin | |
| 2013/0205005 A1 * | 8/2013 | Ashok | G06F 3/0658 709/224 |
| 2013/0219386 A1 | 8/2013 | Geibel et al. | |

(Continued)

FOREIGN PATENT DOCUMENTS

KR 10-2016-0094764 A 8/2016

OTHER PUBLICATIONS

International Search Report and Written Opinion, PCT Application No. PCT/US2022/017930, dated Jul. 14, 2022.

*Primary Examiner* — Charles Rones
*Assistant Examiner* — Han V Doan
(74) *Attorney, Agent, or Firm* — Ravi Mohan; Rutan & Tucker, LLP (57) ABSTRACT

Systems and methods described herein provide for determining priority levels within one or more data streams established between a host computing device and a storage device. Data streams that have been assigned a sufficiently high priority may be provided additional processing resources available within the storage device. These additional processing resources may include an increased number of write buffers, superblocks, and access to other ancillary resources that facilitate an increased level of performance compared to data streams not provided additional processing resources. The assignment of priority to the data streams can occur through the use of one or more priority identifiers. Many types and scales of priority identifiers may be used. The establishing of this system of priority identifiers can occur by the storage device notifying the hose of the accepted priority identifier usage. In other embodiments, the storage device may come preconfigured with a priority indication system and scale.

20 Claims, 6 Drawing Sheets

(56) References Cited

U.S. PATENT DOCUMENTS

| | | |
|---|---|---|
| 2014/0068609 A1 | 3/2014 | Breitgand et al. |
| 2015/0334040 A1 | 11/2015 | Crowell et al. |
| 2016/0373370 A1 | 12/2016 | Suchter et al. |
| 2017/0004005 A1 | 1/2017 | Elliott et al. |
| 2017/0272494 A1* | 9/2017 | Huen .................... G06F 3/0659 |
| 2019/0310905 A1 | 10/2019 | Shin et al. |
| 2020/0201568 A1 | 6/2020 | Park et al. |
| 2020/0344771 A1* | 10/2020 | Kang ................ H04W 28/0263 |
| 2022/0019360 A1* | 1/2022 | La Fratta .............. G06F 3/0631 |
| 2022/0100650 A1* | 3/2022 | Lai ..................... G06F 12/0253 |
| 2022/0291838 A1* | 9/2022 | Gorobets ............. G06F 11/108 |

* cited by examiner

PROVIDING PRIORITY INDICATORS FOR NVME DATA COMMUNICATION STREAMS

FIELD

The present disclosure relates to storage systems. More particularly, the present disclosure relates to providing and processing one or more priority indicators within a plurality of NVMe data communication streams.

BACKGROUND

Storage devices are ubiquitous within computing systems. Solid-state storage devices have become increasingly common. These nonvolatile storage devices can communicate and utilize various protocols including non-volatile memory express (NVMe), and peripheral component interconnect express (PCIe) to reduce processing overhead and increase efficiency It has also become increasingly more common for a storage device to be in communication over a multitude of data communication streams (i.e., channels), often with a plurality of hosts, including virtual hosts. These hosts may be sending various commands to read and/or write data to the storage device (i.e., write and read streams). Typically, these streams being sent to the storage devices for processing are treated equally. Thus, there is no viable method to indicate to the storage device that one data communication stream should receive more priority than the others.

As storage devices are connected to a larger variety of hosts, different levels of service may be offered to each host. There is currently no viable and/or efficient method to mark incoming data communication streams as having priority over another one, despite what level of service one host may be provided versus another. Likewise, in single-host systems, certain operations may be more mission critical and require processing sooner than other commands within the data communication stream.

BRIEF DESCRIPTION OF DRAWINGS

The above, and other, aspects, features, and advantages of several embodiments of the present disclosure will be more apparent from the following description as presented in conjunction with the following several figures of the drawings.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the problems described above, devices and methods are discussed herein that can assign a priority to a data communication stream, such as a stream that conforms to the NVMe standard utilized in numerous devices. In many embodiments, the storage device may have a plurality of processing resources available for use and assignment between the data communication streams. These resources can be unevenly distributed, meaning that additional resources may be assigned to a data communication stream that has been assigned a specific priority. This priority may be assigned and communicated through the use of one or more priority indicators. These priority indicators can include binary, hexadecimal values, or any demarcating label or value.

The use of the priority indicators can be accomplished in a variety of ways. This may include the storage device providing a predetermined set of values and scales to a host computing device. Conversely, the host computing device may have a priority indicator protocol that it presents to the storage device. In still further embodiments, the storage device and host computing device perform a handshake operation and agree on a scale and value for the priority indicators, perhaps based on an external protocol that has predetermined.

Once completed, the priority streams may be modified through a modification identifier which can deallocate or reassigned processing resources within the storage device. Similarly, a closure identifier or similar notification can be utilized to indicate that a data communication channel can be closed. This process can also be utilized between storage devices and multiple hosts. Indeed, the limiting factors may include the number of available data communication streams and the processing resources that can be allocated by the storage device.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C #, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Figure 1:
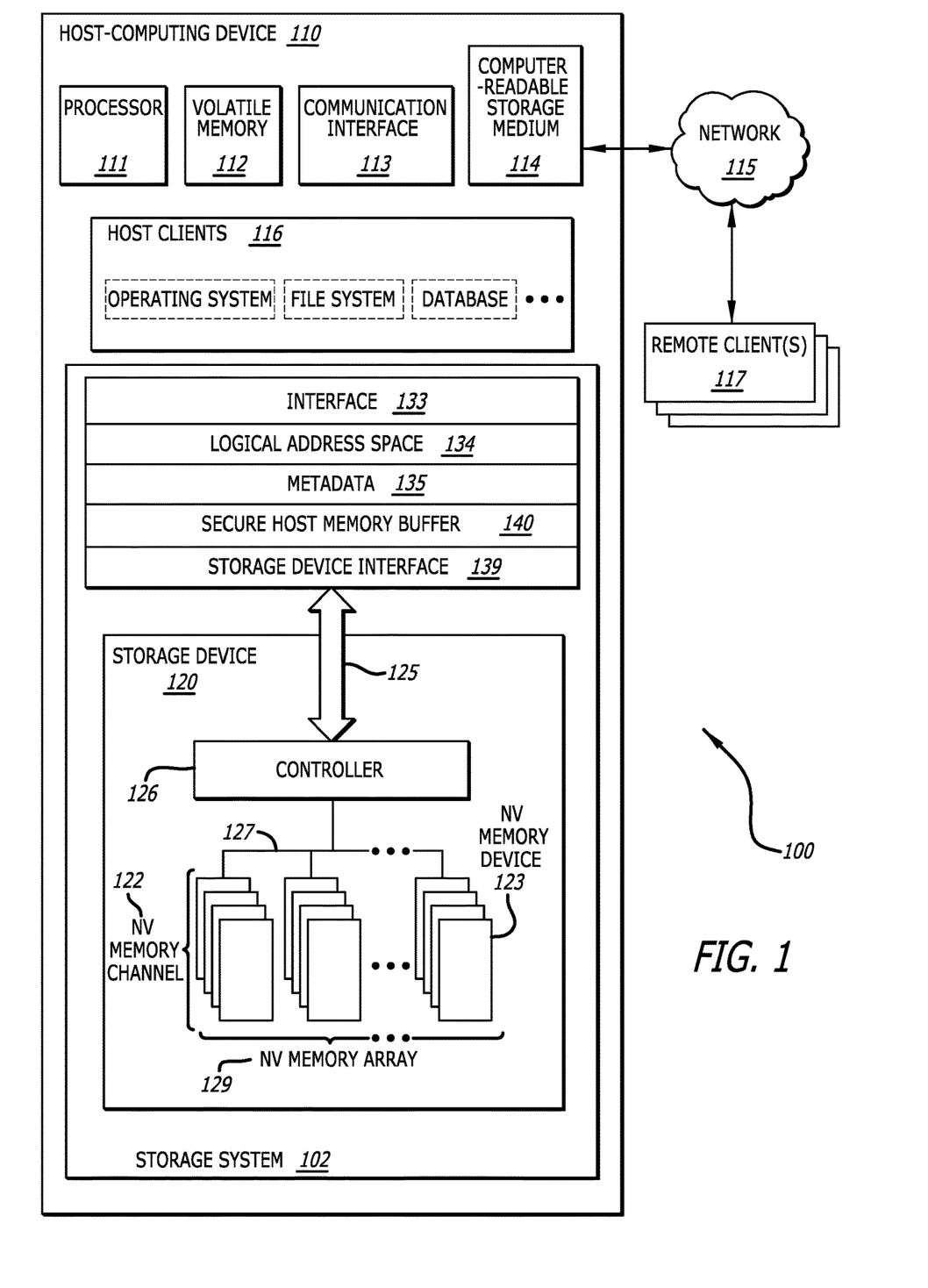
FIG. 1 is a schematic block diagram of a host computing device with a storage device suitable for data communication stream priority management in accordance with an embodiment of the disclosure.

Referring to FIG. 1, schematic block diagram of a host computing device with a storage device suitable for data communication stream priority management in accordance with an embodiment of the disclosure is shown. The control block management system 100 comprises one or more storage devices 120 of a storage system 102 within a host-computing device 110 in communication via a controller 126. The host-computing device 110 may include a processor 111, volatile memory 112, and a communication interface 113. The processor 111 may include one or more central processing units, one or more general-purpose processors, one or more application-specific processors, one or more virtual processors (e.g., the host-computing device 110 may be a virtual machine operating within a host), one or more processor cores, or the like. The communication interface 113 may include one or more network interfaces configured to communicatively couple the host-computing device 110 and/or controller 126 of the storage device 120 to a communication network such as an Internet Protocol (IP) network, a Storage Area Network (SAN), wireless network, wired network, or the like.

The storage device 120, in various embodiments, may be disposed in one or more different locations relative to the host-computing device 110. In one embodiment, the storage device 120 comprises one or more non-volatile memory devices 123, such as semiconductor chips or packages or other integrated circuit devices disposed on one or more printed circuit boards, storage housings, and/or other mechanical and/or electrical support structures. For example, the storage device 120 may comprise one or more direct inline memory module (DIMM) cards, one or more expansion cards and/or daughter cards, a solid-state-drive (SSD) or other hard drive device, and/or may have another memory and/or storage form factor. The storage device 120 may be integrated with and/or mounted on a motherboard of the host-computing device 110, installed in a port and/or slot of the host-computing device 110, installed on a different host-computing device 110 and/or a dedicated storage appliance on the network 115, in communication with the host-computing device 110 over an external bus (e.g., an external hard drive), or the like.

The storage device 120, in one embodiment, may be disposed on a memory bus of a processor 111 (e.g., on the same memory bus as the volatile memory 112, on a different memory bus from the volatile memory 112, in place of the volatile memory 112, or the like). In a further embodiment, the storage device 120 may be disposed on a peripheral bus of the host-computing device 110, such as a peripheral component interconnect express (PCI Express or PCIe) bus such, as but not limited to a NVM Express (NVMe) interface, a serial Advanced Technology Attachment (SATA) bus, a parallel Advanced Technology Attachment (PATA) bus, a small computer system interface (SCSI) bus, a FireWire bus, a Fibre Channel connection, a Universal Serial Bus (USB), a PCIe Advanced Switching (PCIe-AS) bus, or the like. In another embodiment, the storage device 120 may be disposed on a communication network 115, such as an Ethernet network, an Infiniband network, SCSI RDMA over a network 115, a storage area network (SAN), a local area network (LAN), a wide area network (WAN) such as the Internet, another wired and/or wireless network 115, or the like.

The host-computing device 110 may further comprise computer-readable storage medium 114. The computer-readable storage medium 114 may comprise executable instructions configured to cause the host-computing device 110 (e.g., processor 111) to perform steps of one or more of the methods disclosed herein. Additionally, or in the alternative, the buffering component 150 may be embodied as one or more computer-readable instructions stored on the computer-readable storage medium 114.

A device driver and/or the controller 126, in certain embodiments, may present a logical address space 134 to the host clients 116. As used herein, a logical address space 134 refers to a logical representation of memory resources. The logical address space 134 may comprise a plurality (e.g., range) of logical addresses. As used herein, a logical address refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

A device driver for the storage device 120 may maintain metadata 135, such as a logical to physical address mapping structure, to map logical addresses of the logical address space 134 to media storage locations on the storage device(s) 120. A device driver may be configured to provide storage services to one or more host clients 116. The host clients 116 may include local clients operating on the host-computing device 110 and/or remote clients 117 accessible via the network 115 and/or communication interface 113. The host clients 116 may include, but are not limited to: operating systems, file systems, database applications, server applications, kernel-level processes, user-level processes, applications, and the like.

In many embodiments, the host-computing device 110 can include a plurality of virtual machines which may be instantiated or otherwise created based on user-request. As will be understood by those skilled in the art, a host-computing device 110 may create a plurality of virtual machines configured as virtual hosts which is limited only on the available computing resources and/or demand. A hypervisor can be available to create, run, and otherwise manage the plurality of virtual machines. Each virtual machine may include a plurality of virtual host clients similar to host clients 116 that may utilize the storage system 102 to store and access data.

The device driver may be further communicatively coupled to one or more storage systems 102 which may include different types and configurations of storage devices 120 including, but not limited to: solid-state storage devices, semiconductor storage devices, SAN storage resources, or the like. The one or more storage devices 120 may comprise one or more respective controllers 126 and non-volatile memory channels 122. The device driver may provide access to the one or more storage devices 120 via any compatible protocols or interface 133 such as, but not limited to, SATA and PCIe. The metadata 135 may be used to manage and/or track data operations performed through the protocols or interfaces 133. The logical address space 134 may comprise a plurality of logical addresses, each corresponding to respective media locations of the one or more storage devices 120. The device driver may maintain metadata 135 comprising any-to-any mappings between logical addresses and media locations.

A device driver may further comprise and/or be in communication with a storage device interface 139 configured to transfer data, commands, and/or queries to the one or more storage devices 120 over a bus 125, which may include, but is not limited to: a memory bus of a processor 111, a peripheral component interconnect express (PCI Express or PCIe) bus, a serial Advanced Technology Attachment (ATA) bus, a parallel ATA bus, a small computer system interface (SCSI), FireWire, Fibre Channel, a Universal Serial Bus (USB), a PCIe Advanced Switching (PCIe-AS) bus, a network 115, Infiniband, SCSI RDMA, or the like. The storage device interface 139 may communicate with the one or more storage devices 120 using input-output control (IO-CTL) command(s), IO-CTL command extension(s), remote direct memory access, or the like.

The storage system 102 may further include a secure host memory buffer 140. The secure host memory buffer 140 may be configured to receive and store data from a storage device 120. In this way, the secure host memory buffer 140 can be configured as an external memory storage for the storage device 120 which can be utilized for storing priority identifiers and their related protocols and/or data. In certain embodiments, the secure host memory buffer 140 may be configured as a regular, non-secure memory buffer. In still further embodiments, the secure host memory buffer 140 may be stored outside of the storage system 102 and may be located within a different part of the host-computing device 110. In still yet further embodiments, the secure host memory buffer 140 may be located remotely as part of one or more remote clients 117.

The communication interface 113 may comprise one or more network interfaces configured to communicatively couple the host-computing device 110 and/or the controller 126 to a network 115 and/or to one or more remote clients 117 (which can act as another host). The controller 126 is part of and/or in communication with one or more storage devices 120. Although FIG. 1 depicts a single storage device 120, the disclosure is not limited in this regard and could be adapted to incorporate any number of storage devices 120.

The storage device 120 may comprise one or more non-volatile memory devices 123 of non-volatile memory channels 122, which may include but not limited to: ReRAM, Memristor memory, programmable metallization cell memory, phase-change memory (PCM, PCME, PRAM, PCRAM, ovonic unified memory, chalcogenide RAM, or C-RAM), NAND flash memory (e.g., 2D NAND flash memory, 3D NAND flash memory), NOR flash memory, nano random access memory (nano RAM or NRAM), nanocrystal wire-based memory, silicon-oxide based sub-10 nanometer process memory, graphene memory, Silicon Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape), optical storage media, or the like. The one or more non-volatile memory devices 123 of the non-volatile memory channels 122, in certain embodiments, comprise storage class memory (SCM) (e.g., write in place memory, or the like).

While the non-volatile memory channels 122 is referred to herein as "memory media," in various embodiments, the non-volatile memory channels 122 may more generally comprise one or more non-volatile recording media capable of recording data, which may be referred to as a non-volatile memory medium, a non-volatile memory device, or the like. Further, the storage device 120, in various embodiments, may comprise a non-volatile recording device, a non-volatile memory array 129, a plurality of interconnected storage devices in an array, or the like.

The non-volatile memory channels 122 may comprise one or more non-volatile memory devices 123, which may include, but are not limited to: chips, packages, planes, die, or the like. A controller 126 may be configured to manage data operations on the non-volatile memory channels 122, and may comprise one or more processors, programmable processors (e.g., FPGAs), ASICs, micro-controllers, or the like. In some embodiments, the controller 126 is configured to store data on and/or read data from the non-volatile memory channels 122, to transfer data to/from the storage device 120, and so on.

The controller 126 may be communicatively coupled to the non-volatile memory channels 122 by way of a bus 127. The bus 127 may comprise an I/O bus for communicating data to/from the non-volatile memory devices 123. The bus 127 may further comprise a control bus for communicating addressing and other command and control information to the non-volatile memory devices 123. In some embodiments, the bus 127 may communicatively couple the non-volatile memory devices 123 to the controller 126 in parallel. This parallel access may allow the non-volatile memory devices 123 to be managed as a group, forming a non-volatile memory array 129. The non-volatile memory devices 123 may be partitioned into respective logical memory units (e.g., logical pages) and/or logical memory divisions (e.g., logical blocks). The logical memory units may be formed by logically combining physical memory units of each of the non-volatile memory devices 123.

The controller 126 may organize a block of word lines within a non-volatile memory device 123, in certain embodiments, using addresses of the word lines, such that the word lines are logically organized into a monotonically increasing sequence (e.g., decoding and/or translating addresses for word lines into a monotonically increasing sequence, or the like). In a further embodiment, word lines of a block within a non-volatile memory device 123 may be physically arranged in a monotonically increasing sequence of word line addresses, with consecutively addressed word lines also being physically adjacent (e.g., WL0, WL1, WL2, . . . WLN).

The controller 126 may comprise and/or be in communication with a device driver executing on the host-computing device 110. A device driver may provide storage services to the host clients 116 via one or more interfaces 133. A device driver may further comprise a storage device interface 139 that is configured to transfer data, commands, and/or queries to the controller 126 over a bus 125, as described above.

Figure 2:
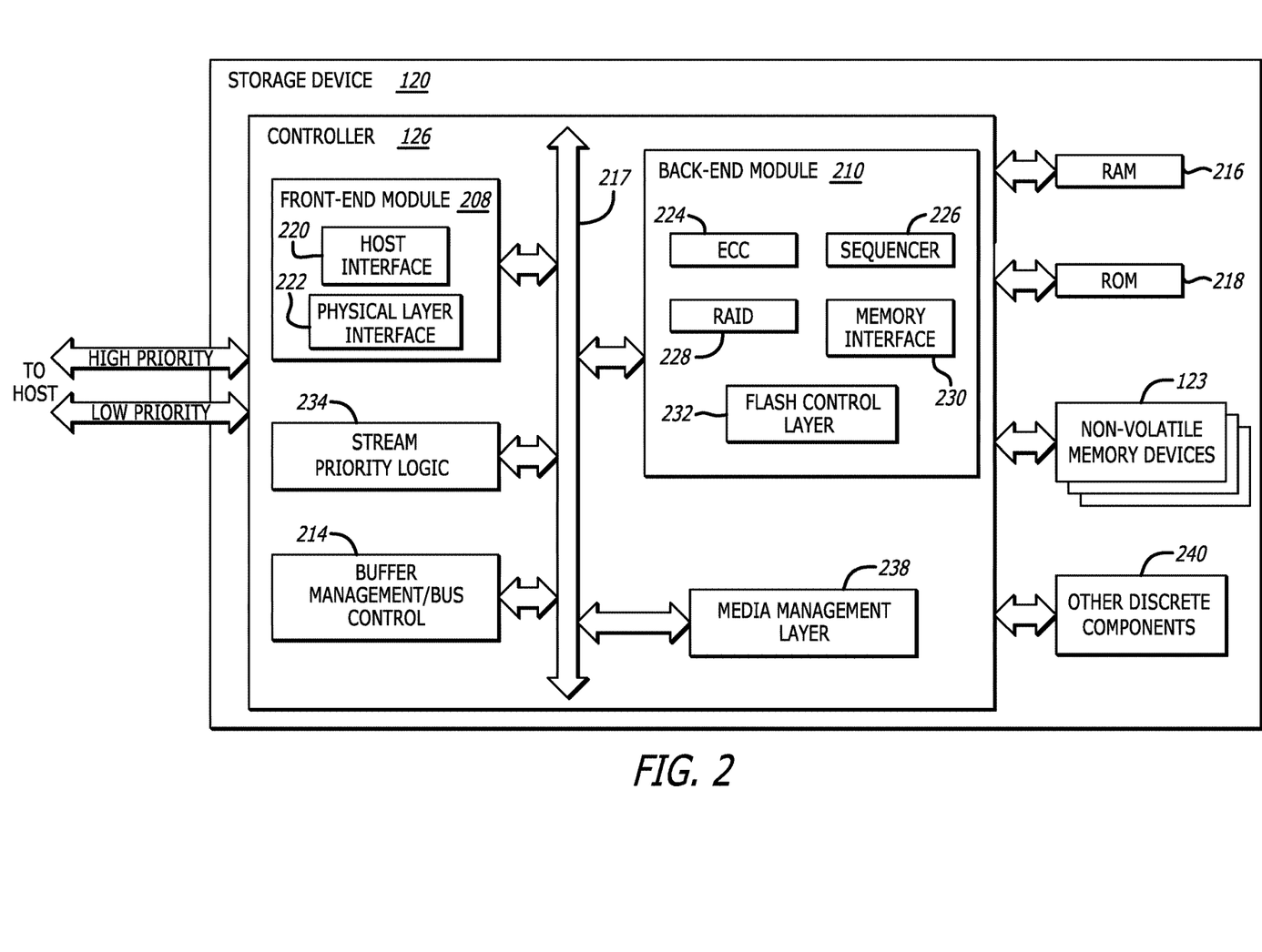
FIG. 2 is a schematic block diagram of a storage device suitable for data communication stream priority management in accordance with an embodiment of the disclosure.

Referring to FIG. 2, a schematic block diagram of a storage device suitable for data communication stream priority management in accordance with an embodiment of the disclosure is shown. The controller 126 may include a front-end module 208 that interfaces with a host via a plurality of high priority and low priority communication streams, a back-end module 210 that interfaces with the non-volatile memory devices 123, and various other modules that perform various functions of the storage device 120. In some examples, each module may just be the portion of the memory that comprises instructions executable with the processor to implement the features of the corresponding module without the module including any other hardware. Because each module includes at least some hardware even when the included hardware comprises software, each module may be interchangeably referred to as a hardware module.

The controller 126 may include a buffer management/bus control module 214 that manages buffers in random access memory (RAM) 216 and controls the internal bus arbitration for communication on an internal communications bus 217 of the controller 126. A read only memory (ROM) 218 may store and/or access system boot code. Although illustrated in FIG. 2 as located separately from the controller 126, in other embodiments one or both of the RAM 216 and the ROM 218 may be located within the controller 126. In yet other embodiments, portions of RAM 216 and ROM 218 may be located both within the controller 126 and outside the controller 126. Further, in some implementations, the controller 126, the RAM 216, and the ROM 218 may be located on separate semiconductor dies. As discussed below, in one implementation, the submission queues and the completion queues may be stored in a controller memory buffer, which may be housed in RAM 216.

Additionally, the front-end module 208 may include a host interface 220 and a physical layer interface 222 that provides the electrical interface with the host or next level storage controller. The choice of the type of the host interface 220 can depend on the type of memory being used. Examples types of the host interfaces 220 may include, but are not limited to, SATA, SATA Express, SAS, Fibre Channel, USB, PCIe, and NVMe. The host interface 220 may typically facilitate transfer for data, control signals, and timing signals.

The back-end module 210 may include an error correction controller (ECC) engine 224 that encodes the data bytes received from the host and decodes and error corrects the data bytes read from the non-volatile memory devices 123. The back-end module 210 may also include a command sequencer 226 that generates command sequences, such as program, read, and erase command sequences, to be transmitted to the non-volatile memory devices 123. Additionally, the back-end module 210 may include a RAID (Redundant Array of Independent Drives) module 228 that manages generation of RAID parity and recovery of failed data. The RAID parity may be used as an additional level of integrity protection for the data being written into the storage device 120. In some cases, the RAID module 228 may be a part of the ECC engine 224. A memory interface 230 provides the command sequences to the non-volatile memory devices 123 and receives status information from the non-volatile memory devices 123. Along with the command sequences and status information, data to be programmed into and read from the non-volatile memory devices 123 may be communicated through the memory interface 230. A flash control layer 232 may control the overall operation of back-end module 210.

Additional modules of the storage device 120 illustrated in FIG. 2 may include a media management layer 238, which performs wear leveling of memory cells of the non-volatile memory devices 123. The storage device 120 may also include other discrete components 240, such as external electrical interfaces, external RAM, resistors, capacitors, or other components that may interface with controller 126. In alternative embodiments, one or more of the RAID modules 228, media management layer 238 and buffer management/bus control module 214 are optional components that may not be necessary in the controller 126.

In certain embodiments, the stream priority logic 234 may facilitate the process of establishing various communication streams between a plurality of host computing devices. In additional embodiments, the process of providing and agreeing on a priority identifier range and protocol can be handled by the stream priority logic 234. In many embodiments though, the stream priority logic 234 is responsible for assigning additional computing resources to data communication streams that exceed a priority identifier threshold (i.e., are considered high priority).

In a variety of embodiments, the stream priority logic 234 may provide a larger number of write buffers to the high priority data communication streams. These write buffers can provide a faster method of writing received data to the memory array. In further embodiments, the stream priority logic 234 can assign additional host append points and/or super blocks to the high priority data communication streams. Storage devices typically utilize host append points to write a set of data to a super block. Each host append point can pick data from one stream data queue and write it to a super block, which can in some cases ensure that stream data is not mixed within the superblocks. In traditional storage devices, each data communication stream was issued or otherwise associated with one host append point which write to one super block. However, stream priority logic 234 may provide multiples of these units to a data communication stream depending on their assigned priority identifier and the protocol previously agreed to.

In still further embodiments, the stream priority logic 234 can assign more parity contexts/buffers to the high priority data communication stream. This may allow for an uneven distribution of these resources, unlike traditional methods. Likewise the stream priority logic 234 can, in certain embodiments, allocate multiple manifest buffers to the high priority data communication stream. Manifest buffers are often configured to store logical block address to physical address mapping data that is stored inside superblocks. Because some embodiments of high priority communication streams are assigned multiple superblocks to write to, an increase number of manifest buffers may also be needed.

Figure 3:
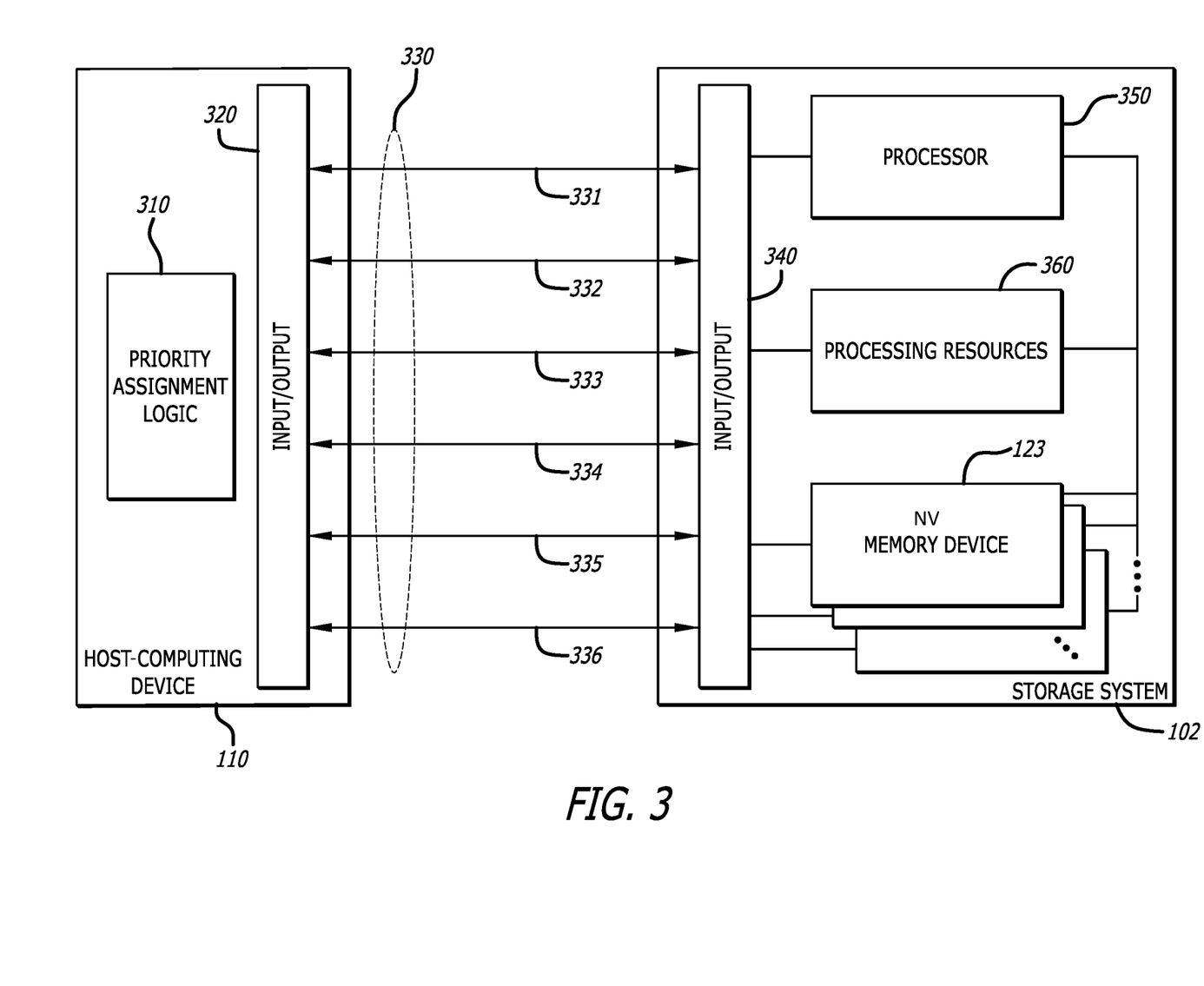
FIG. 3 is a conceptual illustration of a plurality of communication channels between a host computing device and a storage system in accordance with an embodiment of the disclosure.

Referring to FIG. 3, a conceptual illustration of a plurality of data communication streams 330 between a host-computing device 110 and a storage system 102 in accordance with an embodiment of the disclosure is shown. In many embodiments, the host-computing device 110 is communicatively coupled to a storage system 102 which may in many embodiments comprise a storage device. The coupling between the host-computing device 110 and storage system 102 is achieved through a plurality of data communication streams 330 established between them. The host computing device may have a priority assignment logic 310 which may be configured to determine what data requires an increased priority classification for processing within the storage system 102, and then parse which priority identifier should be assigned and recognized by the storage system 102.

The plurality of data communication streams 330 may comprise a series of individual streams 331-336. These streams 331-336 may be interacting through an input/output module 320 within the host-computing device 110, and a similar input/output module 340 within the storage system 102. The storage system 102 may be configured to handle the processing of priority identifiers by parsing and recognizing the priority indicators through one or more processors 350, which may run one or more applications (or utilize a stream priority logic) stored within a plurality of non-volatile memory devices 123.

When a sufficient priority of data arrives within the storage system 102, more available processing resources 360 can be assigned. For example, a first data communication stream 331 may be assigned a priority of "n". A second data communication stream 332 may be issued or otherwise associated with a priority of "n+1." In this example, the priority protocol involved assigning a higher priority to the lowest value within the priority assignment window. As a result, once established, the first data communication stream 331 may be assigned additional processing resources 360 within the storage system 102. In some embodiments, the assigning of additional processing resources 360 means that other data communication streams 332-336 may be assigned fewer resources. In certain embodiments additional processing resources 360 may be natively available within the storage system 102 and can be assigned (i.e., gifted) to a high priority data communication stream.

Figure 4:
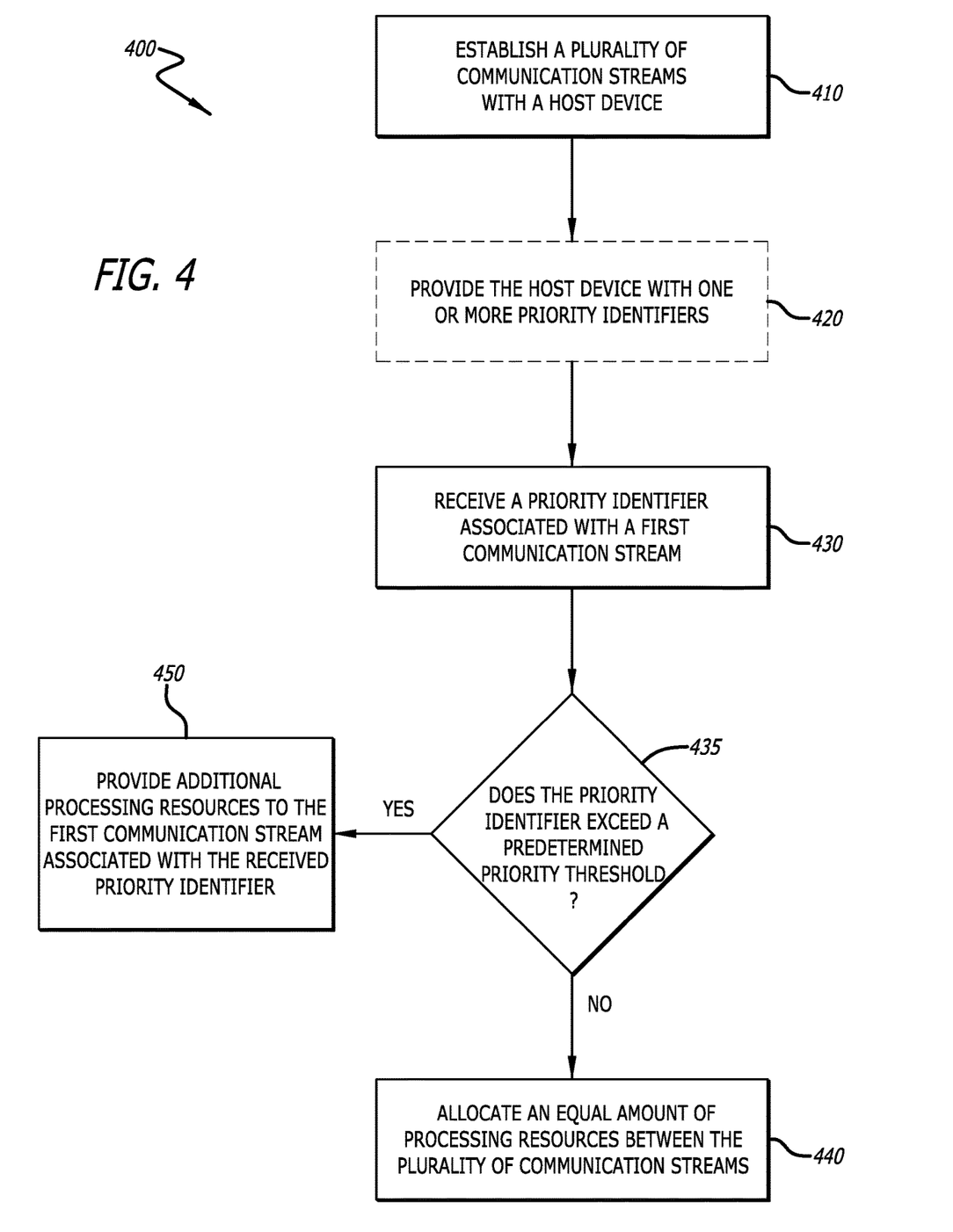
FIG. 4 is a flowchart depicting a process for allocating resources between a plurality of data communication streams in accordance with an embodiment of the disclosure.

Referring to FIG. 4, a flowchart depicting a process 400 for allocating resources between a plurality of communication streams in accordance with an embodiment of the disclosure a is shown. In many embodiments, the process 400 can begin upon the establishment of a plurality of communication streams with a host device (block 410). In some embodiments, the data communication streams may be established across multiple hosts or even local and remote hosts.

Upon establishment of communication, the method of indicating priority may be determined and carried out. For example, in a number of embodiments, the storage device may provide the host computing device with one or more priority identifiers (block 420). These priority identifiers can be configured in a variety of formats suitable for the application desired. For example, the priority communication identifier may be a series of bits, bytes, or hexadecimal designations. These identifiers can be assigned or otherwise associated with each data communication stream. In some embodiments, the highest numerical identifier may be given the highest priority. In other embodiments, the data communication stream with the lowest value is assigned the highest priority.

In this way, priority may be comprised of various levels or classes of priority. For example, a 3-bit binary priority identifier may be able to provide sixteen levels of priority. Likewise, there may be certain applications where only a single data communication stream at a time can receive priority. Additionally, various embodiments may utilize the priority identifiers as classes meaning that multiple data communication streams may be assigned the same priority identifier value. In further embodiments, the priority indicators may be utilized as assignments meaning that each data communication stream is assigned a unique priority identifier. In these embodiments, a grouping of these priority indicators may themselves be classified as high or non-high priority, meaning that a priority identifier beyond a predetermined threshold is given high priority and assigned additional processing resources.

In some embodiments, the host computing device may already be assigned or adhere to a priority identifier protocol. In these cases, the process 400 can include a handshake step that allows the host computing device and storage device to communicate back and forth in order to establish the priority identifier protocol and/or values that will be issues by the host and recognized by the storage device. In further embodiments, the priority identifier system utilized may be established by an outside factor including, but not limited to, the hardware establishing the communication between the host computing device and the storage device.

Upon establishing the protocol and priority identifiers utilized, the process 400 may receive a priority identifier associated with a first data communication stream (block 430). Once received, the priority identifier can be parsed and recognized. The process 400 may then determine if the priority identifier exceeds a predetermined priority threshold (block 435). As discussed above, there are a variety of thresholds and values that may be utilized to make this determination and to qualify as being exceeded under analysis.

If the priority threshold has not been exceeded, an equal allocation of processing resources will occur between all of the available data communication streams (block 440). However, when it is determined that the priority identifier associated with one or more data communication streams exceeds the priority threshold, the process 400 can begin to provide additional processing resources to the first communication stream associated with the priority identifier (block 450).

Figure 5:
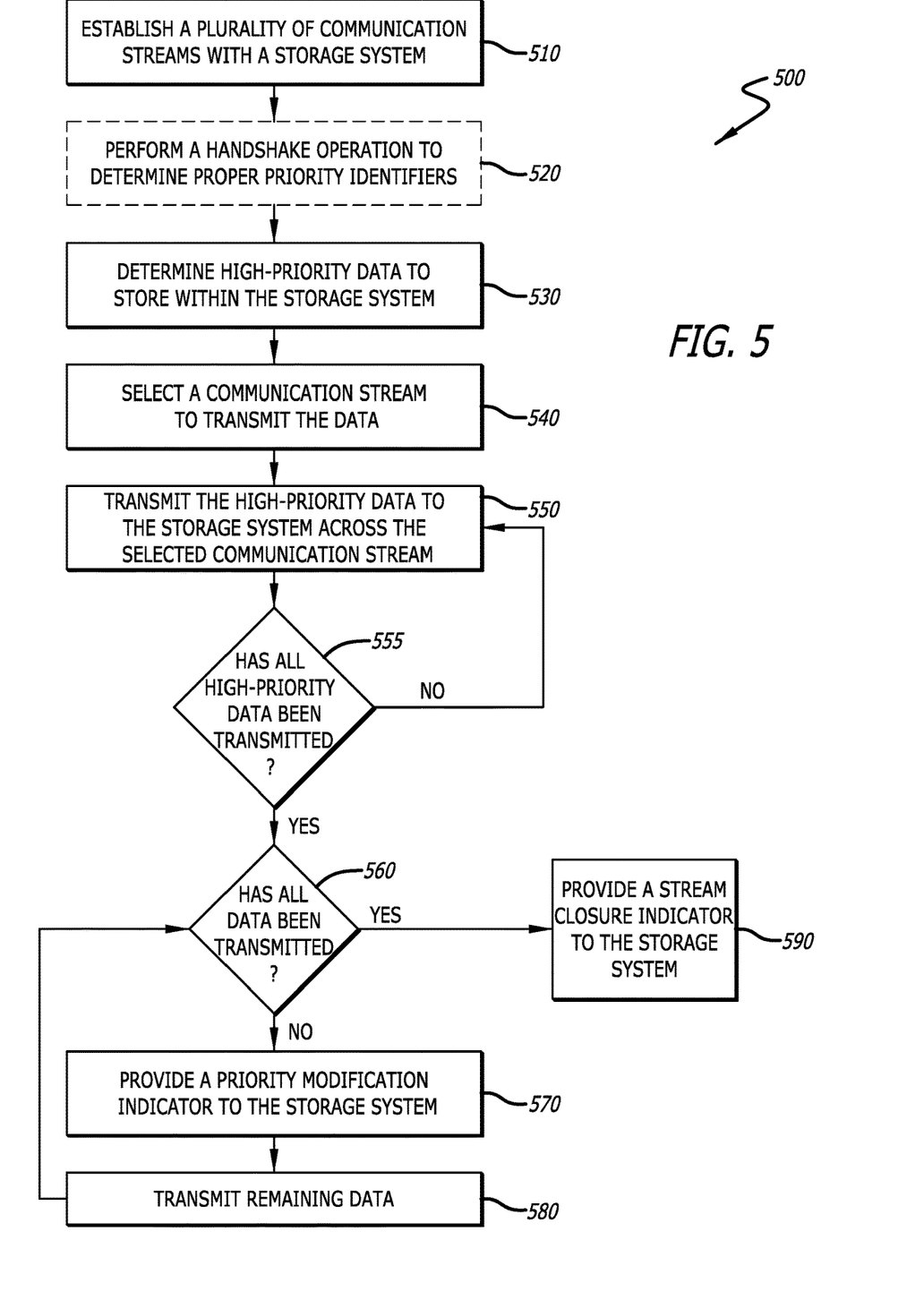
FIG. 5 is a flowchart depicting a process for managing a high priority data communication stream in accordance with an embodiment of the disclosure.

Referring to FIG. 5, a flowchart depicting a process 500 for managing a high priority data communication stream in accordance with an embodiment of the disclosure is shown. In many embodiments, the process 500 can begin as in the process 400 described above; by establishing a plurality of data communication streams between a host computing device and a storage system (block 510). In some embodiments, the storage system and host computing device perform a handshake operation to determine proper priority identifiers (block 520). Examples of this are described above in the discussion of FIG. 4.

Once communication with the storage system is established, the host computing device can determine which high priority data to store (block 530). The data selected can vary greatly depending on the desired application. Once determined, the host computing device can select a communication stream to transmit the data (block 540). As described above, the number of available communication streams available is only limited by the resources available to the system. Once selected, the data can be transmitted to the storage system across the selected communication stream. In many embodiments, the priority indicator will be sent along with the initial part of the data. In further embodiments, the priority indicator may be set for the data communication steam prior to transmission of data. In still additional embodiments, the selected data communication stream may be assigned a general priority identifier upon establishment of communication with the storage device.

Once transmitted, the process 500 can determine if all high priority data has been transmitted (block 555). If more high priority data is available, the process can continue to transmit that data across the selected data communication stream (block 550). However, if all of the high priority data has been transmitted, a further determination may be made to evaluate if all data has been transmitted (block 560). If no more data is to be transmitted across the one or more selected data communication streams, the process 500 can provide a stream closure indicator to the storage system (block 590). In this way, storage systems that are connected to multiple hosts or otherwise have limited data communication streams for use may be able to reallocate that stream to another host or application.

When there is still more data to stream after the high priority data transmission is completed, the process 500 can provide a priority modification indicator to the storage system (block 570). In this way, the overall processing of the data communication stream can be changed to a normal, or non-high priority stream. Upon change, the remaining data may be transmitted (block 580). This process may continue until all data has been transmitted and the data communication stream is closed.

Figure 6:
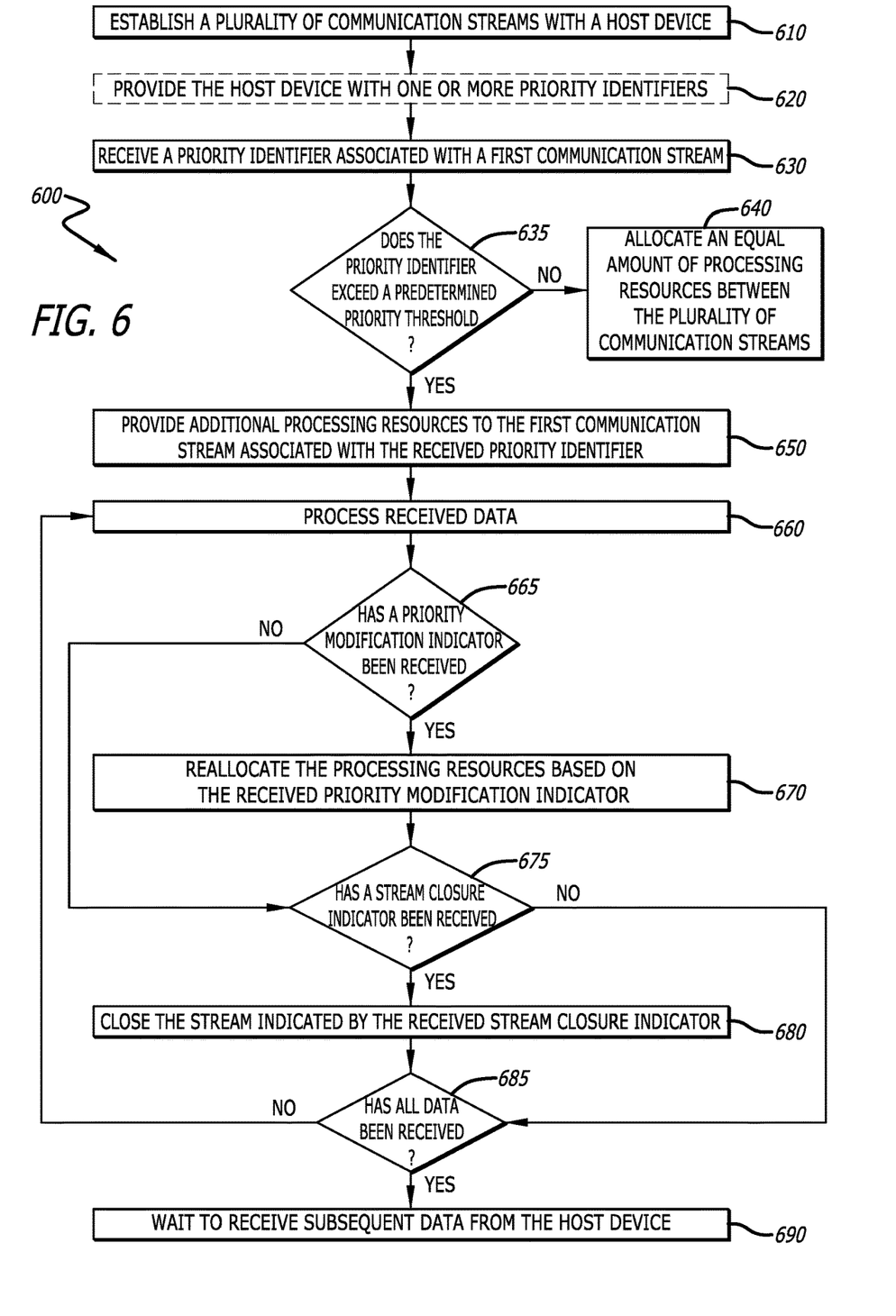
FIG. 6 is a flowchart depicting a process for managing a high priority data communication stream life cycle in accordance with an embodiment of the disclosure.

Referring to FIG. 6, a flowchart depicting a process 600 for managing a high priority data communication stream life cycle in accordance with an embodiment of the disclosure is shown. In many embodiments, the process 600 can begin similarly to the previously described processes 400, 500 and establish a plurality of communication streams between a host computing device and a storage device (block 610). The embodiment depicted in FIG. 6 is described as a storage device establishing and managing data communication priority streams.

In certain embodiments, the storage device can provide the host device with one or more priority identifiers (block 620). As discussed above, a variety of methods of utilizing and processing priority identifiers are available. In various embodiments, the host computing device does not have any preconfigured priority identifiers, and the storage device will provide them and/or the overall protocol to use within the host computing device. Once settled however, the storage device may begin to operate and wait for a priority identifier provided by a host computing device.

Eventually, the storage device may receive a priority identifier associated with a first communication stream (block 630). As described above in the discussion of FIG. 5, some embodiments assign a priority identifier to the data communication stream. In further embodiments, the priority identifier may be assigned to certain data being transmitted through the stream. Once received however, the storage device can determine if the priority identifier exceeds a predetermined priority threshold (block 635). This threshold can vary but may be based on a numerical value with a scale or series of priority identifier values.

Again, if the priority threshold has not been exceeded, an equal allocation of processing resources is assigned by the storage device to operate between all of the available data communication streams (block 640). However, when it is determined that the priority identifier associated with one or more data communication streams exceeds the priority threshold, the process 600 can begin to provide additional processing resources to the first communication stream associated with the priority identifier (block 650).

Upon allocation of processing resources, the received data may be processed (block 660). This operation can continue until another event occurs. In a number of embodiments, the stream will continue to be processed while making a determination if a priority modification indicator has been received (block 665). If none has been received, then a further determination can be made to evaluate if a stream closure indicator has been received (block 675). If neither of those indicators are received, an additional evaluation is done to determine if all data transmitted from the host computing device has been received (block 685). If more data remains to be processed, then the storage device can continue to process the newly received data (block 660).

However, if a priority modification indicator is received during processing the received data, the storage device can reallocate the processing resources based on the received priority modification indicator (block 670). Conversely, if a stream closure indicator is received, the storage device may elect to close the stream indicated by the received stream closure indicator (block 680). Once all data has been received from the host, the storage device can wait to receive subsequent data from the host device (block 690).

Information as herein shown and described in detail is fully capable of attaining the above-described object of the present disclosure, the presently preferred embodiment of the present disclosure, and is, thus, representative of the subject matter that is broadly contemplated by the present disclosure. The scope of the present disclosure fully encompasses other embodiments that might become obvious to those skilled in the art, and is to be limited, accordingly, by nothing other than the appended claims. Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, work-piece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device comprising:
    a processor;
    a memory array comprising a plurality of memory devices;
    a plurality of processing resources for storing received data within the memory array; and
    a stream priority logic configured to:
        establish a plurality of communication streams with a host device;
        provide the host device with one or more priority identifiers that are parsed and recognized;
        receive data from one of the plurality of communication streams, wherein the communication stream providing the received data is assigned a priority identifier; and
        wherein in response to the priority identifier being over a predetermined threshold, additional processing resources are allocated for processing the received data; and
        in response to the priority identifier not exceeding the predetermined threshold, an equal allocation of processing resources is provided across all of the plurality of communication streams.

2. The device of claim 1, wherein providing priority identifiers to the host device is not required in response to the host device being preconfigured with priority identifiers.

3. The device of claim 2, wherein the priority identifiers utilized by the device are the same as the priority identifiers utilized by the host device.

4. The device of claim 3, wherein the stream priority logic is further configured to determine the priority identifiers of the host prior to receiving data from the host device.

5. The device of claim 4, wherein the determination of the priority identifiers occurs as part of the establishing of the plurality of communication streams with the host device.

6. The device of claim 1, wherein the plurality of processing resources includes at least write buffers.

7. The device of claim 6, wherein additional write buffers are allocated for writing the received data associated with a communication stream in response to the priority identifier being over a predetermined threshold.

8. The device of claim 1, wherein the plurality of processing resources includes at least host append points.

9. The device of claim 8, wherein more than one host append point is allocated to the communication stream associated with a priority identifier being over a predetermined threshold.

10. The device of claim 9, wherein the allocation of additional host append points allows for data received from the communication stream associated with a priority identifier being over a predetermined threshold to be stored in more than one superblock.

11. The device of claim 10, wherein the plurality of processing resources also includes additional manifest buffers to facilitate the use of multiple superblock per communication stream.

12. The device of claim 1, wherein the plurality of processing resources includes at least XOR parity buffers.

13. The device of claim 12, wherein additional XOR parity buffers are allocated for storing data received from a communication stream associated with a priority identifier being over a predetermined threshold.

14. The device of claim 1, wherein the priority identifiers are sequentially ordered values.

15. The device of claim 14, wherein the priority identifiers with a lower sequential value are given higher priority.

16. The device of claim 15, wherein the predetermined threshold is exceeded when a priority identifier has a sequential value below a specific value.

17. A method of assigning priority to communication streams, comprising:

establishing a plurality of communication streams to a host device;
providing the host device with one or more priority identifiers for use in assigning priority to the plurality of communication streams;
receiving data from at least one of the plurality of communication streams, wherein the communication stream providing the received data is assigned a priority identifier that is parsed;
wherein in response to the communication stream being assigned a high priority identifier, additional processing resources are allocated for processing the received data; and
in response to the priority identifier not exceeding the predetermined threshold, an equal allocation of processing resources is provided across all of the plurality of communication streams.

18. The method of claim 17, wherein the communication streams conform to the NVMe standard.

19. The method of claim 17, wherein a communication stream is assigned a priority identifiers by the host device.

20. A device comprising:
a processor;
a memory array comprising a plurality of memory devices;
a plurality of processing resources for storing received data within the memory array; and a stream priority logic configured to:
establish a plurality of communication streams with a host device;
determine one or more priority identifiers utilized by the host device;
receive data from a first communication stream, wherein the first communication stream providing the received data is assigned a priority identifier that is parsed;
receive a subsequent command from the host device to close the first communication stream;
wherein in response to the priority identifier being over a predetermined threshold, additional processing resources are allocated to the first communication stream;
in response to the priority identifier not exceeding the predetermined threshold, an equal allocation of processing resources is provided across all of the plurality of communication streams; and
wherein upon closing of the first communication stream, the additional processing resources are reallocated between the remaining streams.

* * * * *